United States Patent [19]

Follmer

[11] Patent Number: 5,168,207

[45] Date of Patent: Dec. 1, 1992

[54] THREE LEVEL CONTROL SYSTEM FOR A VOLTAGE DEPENDENT LOAD

[75] Inventor: William C. Follmer, Livonia, Mich.

[73] Assignee: Ford Motor Company, Dearborn, Mich.

[21] Appl. No.: 653,833

[22] Filed: Feb. 11, 1991

[51] Int. Cl.⁵ .............................................. H02P 7/66
[52] U.S. Cl. ........................................... 322/7; 307/16; 318/140; 322/90
[58] Field of Search ................... 322/90, 7, 8; 307/16; 318/140

[56] References Cited

U.S. PATENT DOCUMENTS

| | | | |
|---|---|---|---|
| 3,028,523 | 4/1962 | Seid | 315/71 |
| 3,151,915 | 10/1964 | Graybeal | 307/3 |
| 3,659,168 | 4/1972 | Salihi et al. | 318/227 |
| 4,084,126 | 4/1978 | Clements | 322/8 |
| 4,473,817 | 9/1984 | Perkins | 340/310 R |
| 4,616,162 | 10/1986 | Radomski | 322/28 X |
| 4,678,982 | 7/1987 | Offiler et al. | 322/8 |
| 4,780,619 | 10/1988 | Campbell et al. | 307/10 R |
| 4,866,365 | 9/1989 | Offiler et al. | 322/8 |

Primary Examiner—R. J. Hickey
Attorney, Agent, or Firm—Paul K. Godwin, Jr.; Roger L. May

[57] ABSTRACT

An electrical control system for a voltage sensitive load having switch means for selecting from single or multiple rectified phases of a multi-phase alternator/generator to provide multiple output levels of DC voltage.

6 Claims, 1 Drawing Sheet

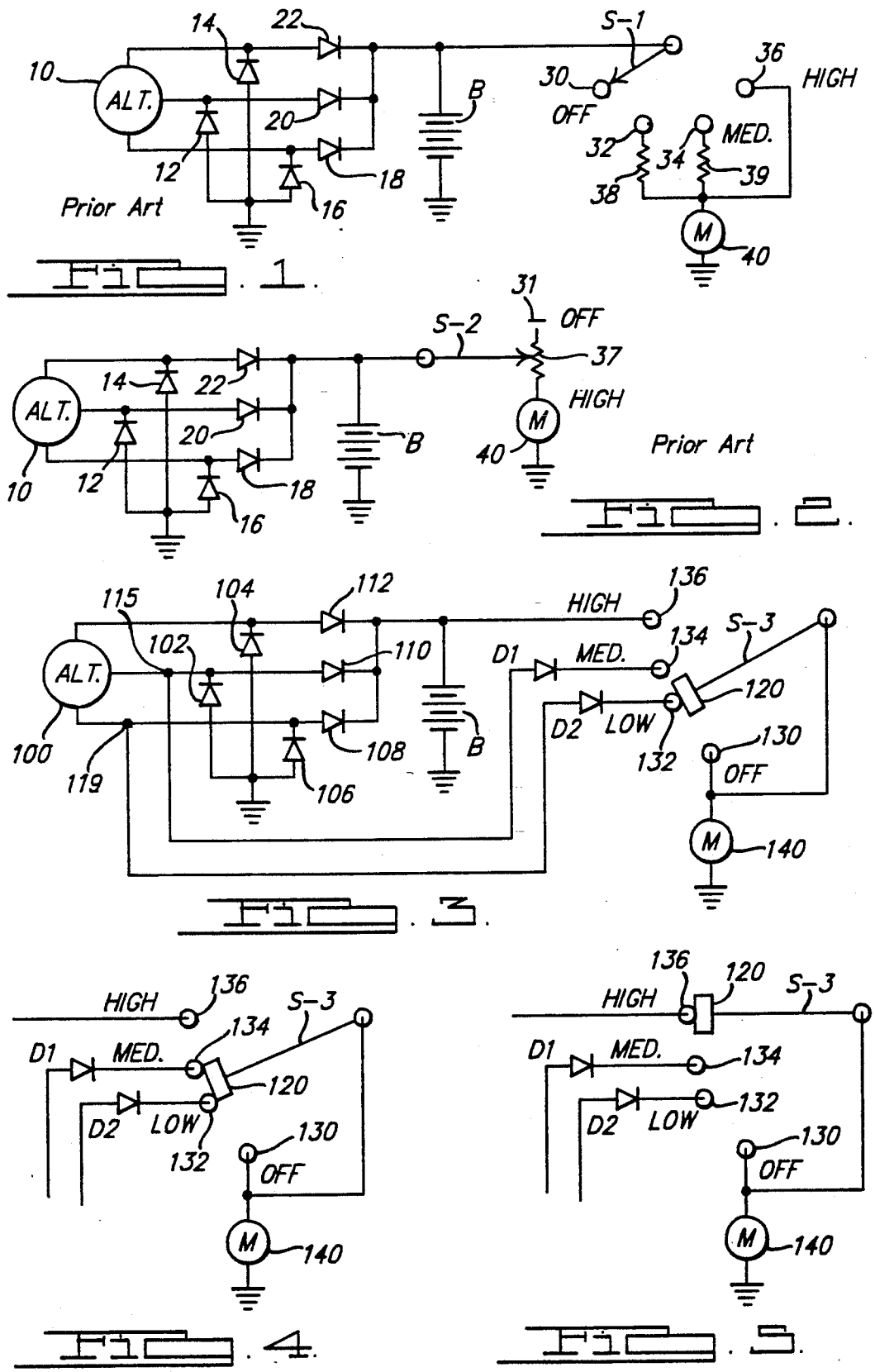

THREE LEVEL CONTROL SYSTEM FOR A VOLTAGE DEPENDENT LOAD

BACKGROUND OF THE INVENTION

1. Field of the Invention

The present invention is directed to the field of electrical control systems and more specifically to the area of selecting from various voltage levels for application to a voltage sensitive load.

2. Description of the Prior Art

In conventional automotive electrical systems, the power used to energize selected loads is supplied by an alternator type DC generator supplemented by a battery. Such systems generally provide a single regulated level of DC voltage that is the rectified sum of three phases of alternating current Produced in the stator windings of the alternator. The full wave rectified output of the alternator is then applied to the battery in parallel with the selected loads. Some of the loads selected in an automotive vehicle are voltage dependent; such as, motors, pumps, heaters and lights. In such cases where a certain amount of control is desired to vary the performance of the voltage dependent load, it is common to place resistance between the supply source and the load to provide a voltage drop in series with the load.

FIGS. 1 and 2 illustrate typical prior art applications of varying the speed of a variable speed D.C. motor 40 utilizing series connected voltage dropping resistors. In FIG. 1, an alternator 10 supplies a DC output voltage to a battery B, through a rectifier bridge assembly made up of diodes 12, 14, 16, 18, 20 and 22. A switch S-1 is between the fully rectified output of the alternator and the motor 40. S-1 is switchable between four positions: an OFF position at contact 30, a LOW speed position at contact 32, a MEDIUM speed position at contact 34, and a HIGH speed position at contact 36. With respect to the LOW speed position of switch S-1, a resistor 38 is connected in series between contact 32 and the motor 40. At the MEDIUM speed position of switch S-1, a resistor 39 is connected in series between contact 34 and motor 40. In the HIGH speed position, the switch S-1 connects contact 36 directly to the motor 40.

When switching between the OFF position and the LOW, MEDIUM or HIGH positions, S-1 Provides the full DC voltage level to the selected contacts. In the LOW speed position at contact 32, resistor 38 is selectively sized to drop a portion of the voltage. The remainder of the voltage is dropped across the motor 40, and it reacts accordingly to rotate at a Predetermined and relatively low speed. Resistor 39 is of lesser value than resistor 38 so that the switching of S-1 to the MEDIUM position provides a lesser proportion of the voltage being dropped across resistor 39 than when in the LOW position; and, therefore, the motor 40 is caused to react and rotate at a somewhat higher speed. At the HIGH setting, the full DC voltage output from the alternator is applied through the contact 36 directly to the motor 40 where the entire voltage is dropped across that motor. The motor then rotates at its highest speed when the switch S-1 is in that position.

The problem with the conventional resistor switching configuration shown in FIG. 1 is that power is wasted in the LOW and MEDIUM switch positions because of the voltage drop across resistors 38 and 39. The wasted energy is manifested in excess heat which, in most cases, needs to be dissipated from the vehicle.

A second prior art approach of providing variable voltage to a voltage sensitive load is shown in FIG. 2. In that case, a switch S-2 is combined with a variable resistor 37 to select a value of resistance between the voltage source and the motor 40 voltage sensitive load. In that case, the switch S-2 has an OFF position 31. The remainder of the adjustments to S-2 incorporate some value of the adjustable resistor 37 in series with the motor 40. As the switch S-2 is adjusted towards the HIGH position, less resistance is in series so that a higher proportion of voltage is dropped across the motor 40. Similar to the prior art configuration shown in FIG. 1, energy is wasted in this prior art configuration because of the unused power dissipated across the series connected resistance.

SUMMARY OF THE INVENTION

The present invention attempts to solve the wasted power problems incurred in prior art voltage controls of voltage sensitive loads by tapping into two of the three phases of a standard alternator/generator, separately rectifying those two phases and switching between the fully rectified output of the alternator, the two phases in combination and a single Phase to select from three separate levels of DC voltage for a voltage sensitive load. In this manner, heat generating resistors are eliminated from the switching mechanism and power is conserved. This has the advantage of also eliminating additional heat dissipating components that might otherwise be used.

BRIEF DESCRIPTION OF THE DRAWINGS

FIG. 1 is a circuit showing a prior art technique of controlling power to a voltage sensitive load.

FIG. 2 is a circuit showing an alternative prior art technique of controlling power to a voltage sensitive load.

FIG. 3 is a circuit showing the present invention.

FIG. 4 is a partial circuit diagram illustrating switch S-3 of the present invention positioned at a MEDIUM setting.

FIG. 5 is a partial circuit diagram illustrating switch S-3 of the present invention positioned at a HIGH setting.

DETAILED DESCRIPTION OF THE PREFERRED EMBODIMENT

In FIG. 3, a conventional alternator 100 is represented which provides three phases of alternating current to a full wave rectifier assembly made up of diodes 102, 104, 106, 108, 110 and 112. A battery B is represented as having its positive terminal connected to the output of the rectifier assembly. The rectified sum of the three phases of output from the alternator is the highest voltage available from the source and is connected to contact 136 of switch S-3.

A first auxiliary diode D1 is connected to the junction 115 between one of the stator windings of the alternator 100 and the diodes 102 and 110 of the rectifier assembly. Diode D1 is in series between that junction 115, and contact 134 of the switch S-3. A second auxiliary diode D2 has its anode connected to junction 119 between another of the stator windings of the alternator 100 and the diodes 106 and 108 of the rectifier assembly. Diode D2 is in series between that junction 119 and the contact 132 on the switch S-3. The switch S-3 also has a contact 130 which is designated as the OFF position. This is connected to both the motor 140 (voltage sensitive load) and a switch wiper contact 120. The wiper contact 120 is switchable between the OFF position, the LOW position as shown in FIG. 3, a MEDIUM position as shown in FIG. 4, and a HIGH Position as shown in FIG. 5.

When the wiper 120 of switch S-3 is in its LOW position, it is connected to receive the rectified voltage of a single phase of the alternator 100 at contact 132. When placed in the MEDIUM position shown in FIG. 4, the wiper contact 120 bridges both switch contacts 132 and 134 to receive the rectified sum of two phases of output from the alternator 100. The rectified sum of two phases is, of course, higher than the rectified single phase of the voltage applied to the motor 140 when the switch S-3 is in the LOW position shown in FIG. 3.

When the switch S-3 is placed in the position shown in FIG. 5, the rectified sum of the three phases of output from the alternator 100 are applied directly to the motor 140 so that it will run at its highest speed.

While the aforementioned invention is described as being applied to a variable speed DC motor 140, it should be clear that this method of selecting voltages can also be applied to lamps, pumps, heaters or any other voltage sensitive load where variable control is desired.

It will be apparent that many modifications and variations may be implemented without departing from the scope of the novel concept of this invention. Therefore, it is intended by the appended claims to cover all such modifications and variations which fall within the true spirit and scope of the invention.

I claim:

1. A circuit for controlling power delivered to a voltage sensitive load from a three phase alternator having separate phase stator windings connected to a rectifying bridge to provide a DC output voltage which is the rectified sum of the three phases, comprising:
    a first auxiliary diode connected to the junction between one phase stator winding of the alternator and its rectifying bridge to provide a DC output voltage;
    a second auxiliary diode connected to the junction between another phase stator winding of the alternator and its rectifying bridge to provide a EDC output voltage;
    a switch having a plurality of selectable positions being connected to said voltage sensitive load, to said DC output from said rectifying bridge and each of said first and second auxiliary diodes to allow selection from a range of dc voltages corresponding to the rectified sum of one, two and three phases.

2. A three speed controller for a DC motor which derives power from its connection to an alternator containing at least a three phase rectifier to output a DC voltage, comprising:
    a first auxiliary diode connected to the junction between one phase stator winding of the alternator and its rectifier to output a DC voltage;
    a second auxiliary diode connected to the junction between another phase stator winding of the alternator and its rectifier to output a DC voltage;
    a switch connected to said motor and switchable to select any one of the DC voltage levels from said three phase rectifier, from said first and second auxiliary diodes in parallel, and from said first auxiliary diode alone.

3. A circuit for controlling power delivered to a voltage sensitive load from a three phase alternator having separate phase stator windings connected to a three phase rectifying bridge to provide a DC output voltage which is the rectified sum of the three phases, comprising:
    a first auxiliary rectifier connected to the junction between one phase stator winding of the alternator and said three phase rectifying bridge to provide a DC output voltage;
    a second auxiliary rectifier connected to the junction between another phase stator winding of the alternator and said three phase rectifying bridge to provide a DC output voltage;
    a switch having a plurality of selectable positions being connected to said voltage sensitive load, to said DC output from said three phase rectifying bridge and to each and both of said first and second auxiliary rectifiers to allow selection from a range of DC voltages corresponding to the rectified sum of one phase, of two phases and of three phases.

4. A three speed controller for a DC motor which derives power from its connection to an alternator containing at least a multi-phase stator winding and a three phase rectifier to output a DC voltage, comprising:
    a first auxiliary single phase rectifier connected to the junction between one phase stator winding of the alternator and the three phase rectifier to output a DC voltage;
    a second auxiliary single phase rectifier connected to the junction between another phase stator winding of the alternator and the three phase rectifier to output a DC voltage;
    a multiposition switch electrically connected in series with said motor and switchable to select any one of the DC voltage levels from said three phase rectifier, from said first and second auxiliary rectifiers in parallel, and from said first auxiliary rectifier alone to apply said selected DC voltage level to said motor.

5. A method of selecting from three levels of DC voltage to power a voltage sensitive load, comprising the steps of:
    providing an alternator with at least three stator windings to provide a corresponding number of phased voltages which are rectified by a diode bridge assembly to provide a relatively high DC output voltage;
    providing a first auxiliary diode connected to the junction between one phase stator winding of the alternator and its rectifier to provide a DC output voltage;
    providing a second auxiliary diode connected to the junction between another phase stator winding of the alternator and its rectifier to provide a DC output voltage;
    providing a multiposition switch to connect said load to one of three rectified voltage levels consisting of said relatively high DC voltage level from said diode bridge assembly, a relatively low DC voltage level from said first auxiliary diode, and a relatively intermediate DC voltage level from said first and second auxiliary diodes in parallel.

6. A three speed controller for a DC motor which derives power from its connection to an alternator containing at least a multi-phase stator winding and a three phase rectifier to output a DC voltage, comprising:

a first auxiliary single phase rectifier connected to the junction between one phase stator winding of the alternator and the three phase rectifier to output a DC voltage;

a second auxiliary single phase rectifier connected to the junction between another phase stator winding of the alternator and the three phase rectifier to output a DC voltage;

a manually actuable multiposition switch electrically connected in series with said motor and switchable to select any one of three DC voltage levels comprising that available directly from the output of said three phase rectifier, from said first and second auxiliary rectifiers in parallel, and from said first auxiliary rectifier alone to apply said selected DC voltage level to said motor.

* * * * *